United States Patent [19]
Frisch

[11] Patent Number: 5,318,271
[45] Date of Patent: Jun. 7, 1994

[54] PIEZO VALVE
[75] Inventor: Herbert Frisch, Vienna, Austria
[73] Assignee: Hoerbiger Ventilwerke Aktiengessellschaft, Vienna, Austria
[21] Appl. No.: 989,439
[22] Filed: Dec. 11, 1992
[30] Foreign Application Priority Data
Dec. 11, 1991 [AT] Austria .................. 2464/91
[51] Int. Cl.$^5$ .............................................. F16K 31/02
[52] U.S. Cl. .................... 251/129.06; 137/82
[58] Field of Search ............ 251/129.06; 137/82, 137/83, 85

[56] References Cited
FOREIGN PATENT DOCUMENTS

| | | | |
|---|---|---|---|
| 3608550 | 9/1987 | Fed. Rep. of Germany . | |
| 0074901 | 4/1986 | Japan | 251/129.06 |
| 0246667 | 10/1987 | Japan | 251/129.06 |
| 0101588 | 5/1988 | Japan | 251/129.06 |
| 608011 | 5/1978 | U.S.S.R. | 251/129.06 |

OTHER PUBLICATIONS

Patent Abstracts of Japan, vol. 014, No. 338 (M-1014), Aug. 22, 1990 & JP-A-214638 (Yukinori) Nov. 25, 1988.

Primary Examiner—Robert G. Nilson
Attorney, Agent, or Firm—Watson, Cole, Grindle & Watson

[57] ABSTRACT

In order to balance out the effects of the electrical and mechanical relaxation of a piezo-electric bending element which has a control area that moves in response to an applied control voltage against an elastically applied counterforce, the counterforce is applied by way of a separate external loading system. In addition, the bending element can be pre-tensioned elastically against the action of the counterforce by means of a clamped end.

4 Claims, 1 Drawing Sheet

PIEZO VALVE

BACKGROUND OF THE INVENTION

1. Field of the Invention

The present invention relates to a piezo valve with a piezo-electric bending element, this having a control area that can be moved against an elastically applied opposing force as a function of an applied control voltage.

2. The Prior Art

Valves of this kind which, in keeping with their most frequent application, are frequently referred to as electro-pneumatic converters, are already known. These incorporate a piezo-electric, mostly a piezo-ceramic bending element as a regulating element, and this is fixed at one end. When it is in the switch position in which no voltage is applied, the moveable control area of the bending element that is opposite the end that is clamped is pre-tensioned and lies against an air-inlet valve such that this valve is closed so as to be pressure-sealed. When a control voltage is applied, the bending element is then raised from the air inlet valve seat, against the pre-tensioned counterforce, which means that this valve is then opened to permit the flow of medium. Also known are arrangements in which, according to the same principle, there is a changeover between an inlet and an outlet valve seat, so that a selectable change in the flow of the medium can be effected by the position of the control area.

Because of the properties of piezo-electric materials, the bending elements in this type of valve entail the disadvantage that if they are acted upon mechanically and/or electrically over a longer period of time, their rest position changes. The corresponding property is also referred to as relaxation, and a distinction is drawn between two basic types. The change in shape that takes place under mechanical loading over a longer period of time is referred to as mechanical relaxation, and this is oriented against the direction of the pre-tensioning force. The change in shape that can be identified when an electrical control voltage is applied over a longer period of time, and which is perceived as an increase in the bending, is referred to as electrical relaxation, and this acts in the direction of the electrical bending. It is known that both the mechanical and the electrical relaxation can only be reversed in part and, taken together, they change the adjusted position of the bending element to an unacceptable extent that can, for example, lead to the fact that, after the bending element has been acted upon for a longer time by the voltage, the control area of this will not return to the other switched position, even after the control voltage is switched off and this, in turn, can mean that the valve seat that is associated with the resting position can no longer be closed.

It is an object of the present invention to so improve a piezo valve of the type described in the introduction hereto, that the disadvantages addressed above, which are a consequence of electrical and mechanical relaxation, are avoided and that, in particular, it can be ensured that the bending element functions reliably even after longer-lasting switching cycles.

SUMMARY OF THE INVENTION

According to the present invention, this has been achieved by using a piezo valve of the type described in the introduction hereto, such that the counterforce is applied through a separate external loading system. This takes advantage of the fact that mechanical relaxation within the bending element only occurs as a consequence of a pre-tensioning force that is exerted from the bending element itself in conjunction with the clamping at one end. When the elastic counterforce that is required to maintain the one switch position of the bending element is applied through a separate external loading system, the effect of mechanical relaxation within the bending element is suppressed from the very outset.

This fundamental embodiment of the present invention is best suited for applications in which, for example, provision is made such that when the piezo-electric bending element is in the resting position, when no voltage is applied, it seals a valve seat for a longer period by the action of the external loading system and is only raised from this seat, against the counterforce, for comparatively short periods of time under the action of an applied control voltage. In this case, the effect of electrical relaxation, which is not taken into account, can be disregarded.

In order to be able to cover all other applications in which the effect of the electrical relaxation, which fundamentally occurs in a clearer form, has to be considered or cancelled out, in an especially preferred embodiment of the present invention it is foreseen that the bending element itself is pre-tensioned elastically against the action of the counterforce because one of its ends is clamped. Thus, in a very simple way, it is ensured that the effective directions of the mechanical relaxation, on the one hand, and of the electrical relaxation, on the other hand, are directed against each other, with the result that during practical operation of a piezo valve of this kind there is no cumulative effect of the undesirable influences of electrical and mechanical relaxation, which was unavoidable in the systems known up to the present.

A further configuration of the present invention is particularly advantageous in the last-named connection; according to this, the pre-tensioning of the bending element against the counterforce is sufficiently great that the electrical and mechanical relaxation that occur under the action of the control voltage or of the deflection of the bending element that is caused thereby, balance each other out, at least in part. Because of this, it is possible to achieve an extremely advantageous elimination or mutual compensation of the two named types of relaxation, at least for preferred operating states or switch positions of the piezo valve so that even in the case of switch positions that are to be maintained for longer periods of time, there is no loss of adjustment of the bending element and no associated impairment of function of the piezo valve can occur.

In a further configuration of the present invention, in one switch position the bending element can seal an air intake valve seat under the action of a spring, preferably a coil spring, that acts in the control area, and can be pre-tensioned against the action of the spring with a pre-tensioning force that is smaller than the difference of the pre-tensioning force of the spring and the pre-tensioning force of the incoming air, this resulting in an embodiment which, on the one hand, in one switch position ensures effective maintenance of the air inlet valve seal and, on the other hand, permits at least extensive compensation of the undesirable effects of electrical and mechanical relaxation.

BRIEF DESCRIPTION OF THE DRAWINGS

The invention will now be described in more detail, by way of example only, with reference to the accompanying drawings, in which:

FIG. 2 is shown as a consequence of mechanical relaxation over time (t);

DETAILED DESCRIPTION OF THE PREFERRED EMBODIMENT

Figure 1:
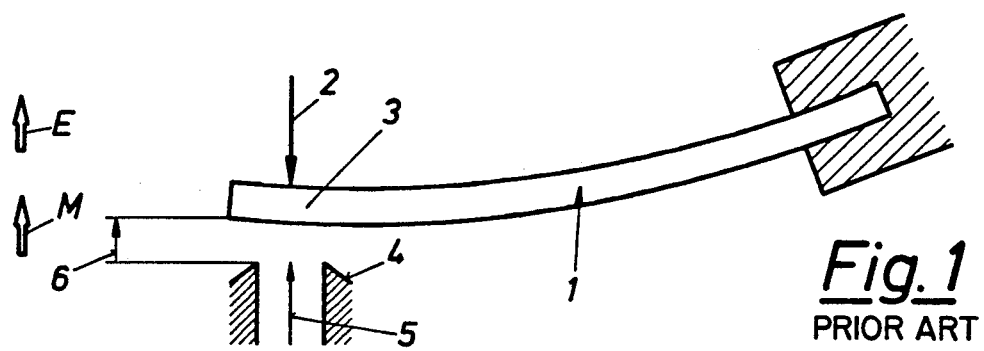
FIG. 1 shows a detail of a piezo valve as in the prior art.

A piezo valve as in the prior art, shown in FIG. 1 (but not in complete detail), incorporates a piezo-electric bending element 1 that incorporates a control area 3 that moves according to the control voltage that is applied to it (the contacts not shown herein) against an elastically-applied counterforce (arrow 2). In the rest state of the bending element 1 in which no voltage is applied (not shown herein), the control area 3 lies on an air intake valve seat 4 under the action of the counterforce (2) and thereby seals this providing it is ensured that the counterforce (2) is greater than or equal to the force of the air intake pressure that acts in the direction indicated by the arrow 5 as a consequence of intake air pressure. When a control voltage is applied, the control area 3 of the piezo-electric bending element 1 is raised in the direction indicated by the arrow 6 away from the air intake valve 4, against the action of the counterforce (2).

The direction of the additional mechanical relaxation of the bending element 1 that also occurs in the raised control position shown in FIG. 1 is indicated by the arrow M, and that of the electrical relaxation is indicated by the arrow E. In this known arrangement according to the prior art, both of these act in the same direction, which is away from the inlet air valve 4, so that during longer periods of time in the raised switch position of the control area 3, as a consequence of continuing deformation, the control area 3 will no longer return to the lower, sealing, switch position, even after the control voltage has been switched off.

Figure 2:
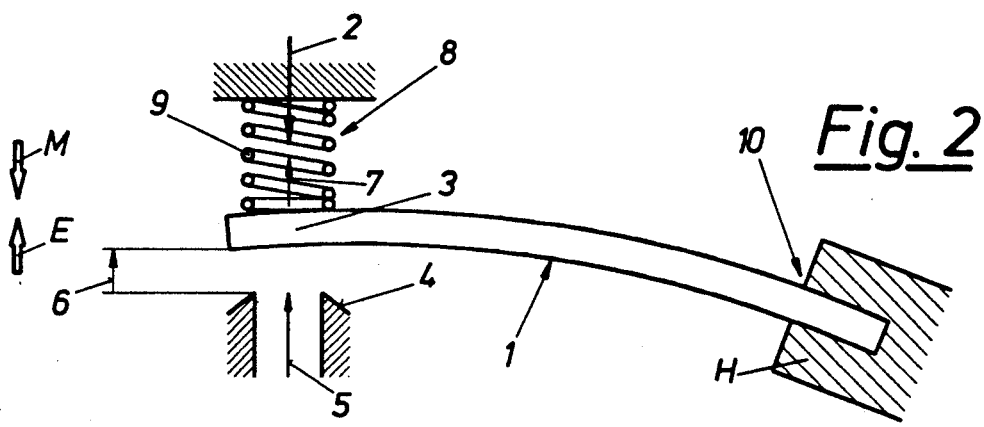
FIG. 2 shows a corresponding detail from an embodiment according to the present invention.

In the example of the valve according to the present invention shown in FIG. 2, the counterforce (arrow 2) is applied through a separate external loading system, formed here by a spring 8, for example a coil spring, that acts in the control area 3. Here, too, the bending element 1 is itself pre-tensioned against the action of the counterforce (2) by means of its clamped end 10 attached to valve housing 14, this being symbolized by the arrow 7. The pre-tensioning (7) of the bending element 1 against the counterforce (2) has been selected to be sufficiently great that the electrical relaxation (arrow E) and the mechanical relaxation (arrow M) that occur under the action of the control voltage or of the deflection (arrow 6) of the bending element 1 that is caused by this, cancel each other out, at least in part. This means that the disadvantages that occur when a voltage acts on the bending element 1 for longer periods of time, as described in connection with FIG. 1, can be avoided.

Figure 3:
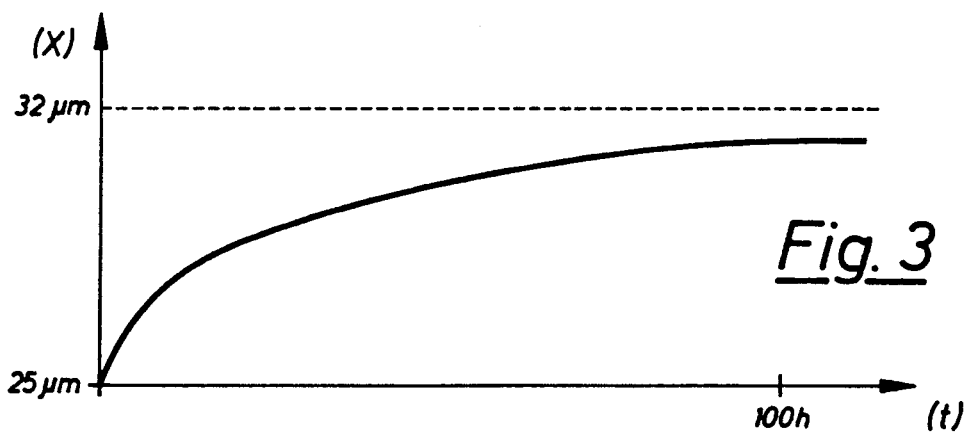
FIG. 3 is a diagram in which the deflection (path x) of a piezo-electric bending element as in FIG. 1

It can be seen from FIG. 3, which makes the mechanical relaxation clear, that in an actual piezo-electric bending element under test, after constant loading with 4 g there was initially a deflection (x) of 25 $\mu$m. In a longer test there was then an asymptotic curve of a further deflection, which stabilized above a loading duration (t) of 100 hours to give a final deflection of 32 $\mu$m, when the additional deflection of 7 $\mu$m that occurred as a consequence of mechanical relaxation after removal of the load only fell slightly, or remained for the most part constant.

Figure 4:
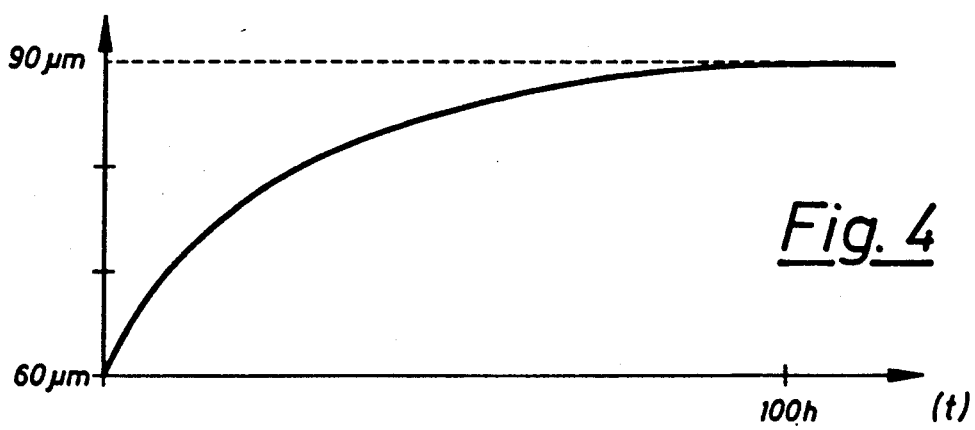
FIG. 4 is a corresponding diagram showing electrical relaxation.

FIG. 4 shows the effect of electrical relaxation in the same bending element as in FIG. 3. When a constant voltage of 25 V DC is applied there is an initial deflection (x) of 60 $\mu$m, which rises above a duration (t) of 100 hours asymptotically to approximately 90 $\mu$m, when here, too, the additional deflection of 30 $\mu$m that occurs as a consequence of electrical relaxation only falls to a slight extent after removal of the voltage.

By comparing FIG. 3 and FIG. 4 it can be seen that, relative to the same duration of load, the electrical relaxation is greater by a factor of approximately four than the mechanical relaxation, which will naturally have to be considered together with the other constructive parameters of an actual embodiment of the piezo-electric valve according to the present invention in order to achieve the intended, at least partial, compensation of the electrical and mechanical relaxation.

The embodiments of the invention in which an exclusive property or privilege is claimed are defined as follows:

1. A piezo valve comprising a housing, means forming a valve seat in said housing, a piezo-electric bending element mounted in said housing and having a control area that moves relative to said valve seat in response to an applied control voltage against an elastically-applied counterforce, and a separate external loading means for applying said counterforce, said bending element being mounted in said housing to be pre-tensioned elastically against the action of said separate external loading means.

2. The piezo valve as claimed in claim 1, wherein the bending element is mounted in said housing such that the pretensioning against the counterforce is sufficiently great that electrical and mechanical relaxation that occur to said bending element under the action of the control voltage or deflection of the bending element caused thereby at least partly cancel each other out.

3. A piezo valve as claimed in claim 1, wherein said separate external loading means is a spring, wherein in one switch position the bending element lies sealingly against said valve seat under the action of said spring which acts on said control area, and wherein the bending element is mounted to be pre-tensioned against the action of the spring with a pre-tensioning force that is smaller than a difference between the pre-tensioning force of the spring and the force of intake air pressure passing through said valve seat.

4. A piezo valve as claimed in claim 3, wherein said spring is a coil spring.

* * * * *